United States Patent

[11] 3,570,407

| [72] | Inventor | Arthur R. Burch |
| | | Battle Creek, Mich. |
| [21] | Appl. No. | 24,423 |
| [22] | Filed | Apr. 7, 1970 |
| [45] | Patented | Mar. 16, 1971 |
| [73] | Assignee | Clark Equipment Company |
| | | Continuation of application Ser. No. |
| | | 704,742, Feb. 12, 1968, now abandoned. |

[54] AUTOMATIC VEHICLE CONTROL SYSTEM
4 Claims, 5 Drawing Figs.

[52] U.S. Cl..................................................... 104/242,
104/149, 104/153, 180/77, 180/79, 180/98
[51] Int. Cl....................................................... B61b 13/00,
B62d 5/00
[50] Field of Search.......................................... 180/98,
79.1, 79.2, 77; 104/149, 152, 153, 242, 245

[56] References Cited
UNITED STATES PATENTS

| 734,061 | 7/1903 | Hansler | 104/242 |
| 2,424,288 | 7/1947 | Severy | 180/79.2 |
| 3,086,479 | 4/1963 | Kucher | 180/124X |
| 3,111,092 | 11/1963 | Raviolo | 104/23(FS)UX |

Primary Examiner—A. Harry Levy
Attorneys—Kenneth C. Witt, John C. Wiessler, Robert H. Johnson and Reginald J. Falkowski ABSTRACT: An automatically controlled vehicle is driven longitudinally along a path defined by an inverted angle iron track. an air pressure system on the vehicle has outlets discharging against opposing surfaces of the angle iron to produce a back pressure at each outlet varying with the distance of the outlet from the angle iron surface. The pressure at each of the outlets is sensed by a differential pressure transducer and a signal varying as the difference between the pressures is applied to a steering system to control the direction of movement of the vehicle. Other air outlets having pressure sensitive switches adjacent to the outlets are located on the vehicle and blocking plates are mounted at selected stations along the track to create a back pressure at the outlets. The back pressure when an outlet is adjacent a plate is sensed and analyzed by a logic system to control movement of the vehicle along the track.

Patented March 16, 1971
3,570,407
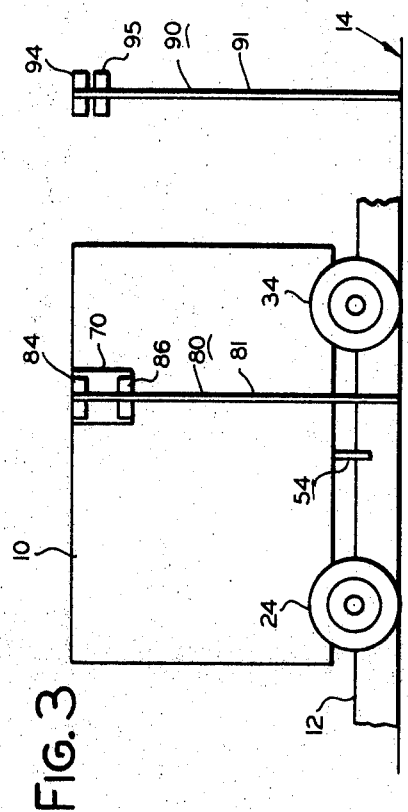
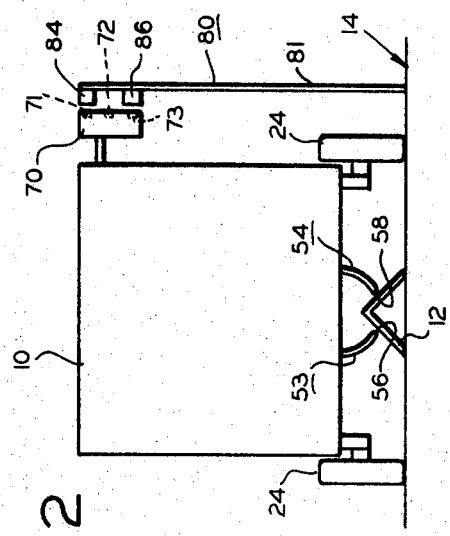
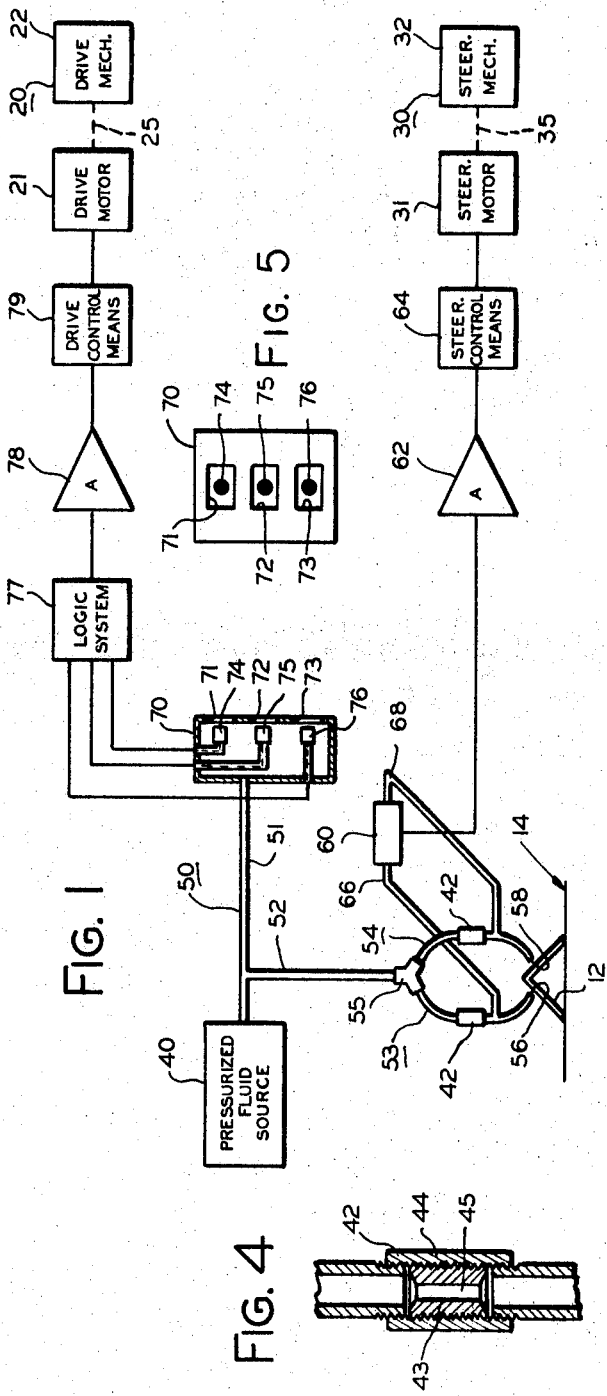
INVENTOR
ARTHUR R. BURCH
BY R. J. Jackowski
ATTORNEY

AUTOMATIC VEHICLE CONTROL SYSTEM

This application is a continuation of application, Ser. No. 704,742, filed Feb. 12, 1968, and which has since become abandoned.

This invention relates to a means and method for automatically controlling moving vehicles, particularly to a means and method that includes sensing the position of the vehicle relative to a selected path and automatically moving and steering the vehicle along the selected path.

Systems have been developed for automatically moving vehicles from one position to another along roads, tracks, or lines without requiring operators to control vehicle speed and direction. Such a system may be any one of several types and may sense the vehicle position relative to cables, electrical wires, magnetic elements, or light reflective strips by mechanical, electrical, magnetic, or optical means, respectively, to move the vehicle along the track defined by the guiding elements. Automatic speed and station selection controls are often provided to automatically stop and start the vehicle as desired. The present systems are used in many applications, including automatic material handling equipment in manufacturing plants and storage warehouses, and generally are satisfactory under ideal conditions. However, these systems are often expensive and difficult to maintain and, in many applications, are not practical because of dust or dirt conditions and because of the sophistication of the sensing elements required for satisfactory operation.

With this invention, a system is provided that uses pressure sensing elements in a pressurized fluid, usually air, system to sense the position of the vehicle relative to a defined track and to selected stations. The use of a pressurized air system eliminates many of the problems encountered in other types of systems and enables the system to operate with fluidic elements completely or to any degree desired.

The advantages and objects of a system according to this invention will be apparent from the following description.

FIG. 1 is a schematic drawing of a system for guiding a vehicle according to this invention;

FIG. 2 is a simplified end view of a vehicle according to this invention;

FIG. 3 is a side view of FIG. 2;

FIG. 4 is an enlarged detailed view of a portion of the system shown in FIG. 1; and FIG. 5 is an end view of a portion of the system shown in FIG. 1.

Referring to FIG. 1, an automatic vehicle control system has portions mounted on a vehicle 10 as generally shown in FIGS. 2 and 3, and comprises vehicle 10; a means for longitudinally moving the vehicle 20, shown schematically, comprising a drive motor 21 and a driving mechanism 22 of any suitable type including drive wheels 24, controlled by drive motor 21, as shown symbolically by dashed line 25; a means for steering the vehicle 30, shown schematically, comprising a steering motor 31 and a steering mechanism 32 of any suitable type including steering wheels 34, as shown symbolically by dashed line 35; a means for guiding the means for steering and the vehicle; a means 40 for supplying pressurized fluid; a means for indicating the lateral position of the vehicle; a means for producing an output signal responsive to the indication of the vehicle lateral position; a means for controlling the means for steering, and a means for controlling the means for moving.

The means for guiding the means 30 for steering and the vehicle comprises a mechanical rail, such as an angle iron 12, mounted on a ground surface 14 that guides the vehicle along a selected path of movement. An angle iron is used because it is an appropriate, simple device, desirable for most environments, that has opposing surfaces normal to the defined path. However, other track devices can be used if they provide the desired surface or surfaces.

The means 40 for supplying pressurized fluid, in most applications pressurized air, comprises a pressurized fluid sources 40 of any known type such as an air compressor (not shown) and the necessary power source (not shown) and associated conduits.

The means for indicating the lateral position of the vehicle relative to the guiding means comprises, generally, a conduit structure 50, at least in part connected to and mounted on vehicle 10 and connected to pressurized sources 40 that includes conduits 51 and 52, conduit section 53 and 54, and fluid discharge outlets 56 and 58. Discharge outlets 56 and 58 are located in proximity to the angle iron to discharge air against opposite sides of the angle iron at discharge angles at least partially in opposition to each other and at least partially normal to the angle iron surfaces. This produces a back pressure level at each of the outlets and within the respective conduit structure indicating the distance of each outlet from its associated angle iron surface. Discharge outlets 56 and 58 are in communication with fluid source 40 through conduits sections 53 and 54, respectively, a flow divider 55, and conduits 52 and 51. Conduit sections 53 and 54 each respectively include a pressure control device, such as a pressure bleed device 42, shown in detail in FIG. 4, connected in each conduit section to produce a controlled back pressure level at sensing conduits 66 and 68, which are connected to respond to the back pressure at outlets 56 and 58, respectively.

Pressure bleed device 42 (FIG. 4), comprises a threaded insert 43 screwed into a tapped coupling 44 that joins two conduits to form conduit sections 53 and 54. Insert 43 has a centrally drilled hole 45 of a reasonably accurately controlled size to provide a selected amount of resistance to the air flow and enable a sensing at conduits 66 and 68 of the back pressure at outlets 56 and 58 with the desired accuracy.

The means for producing an output signal includes sensing conduits 66 and 68, which are in communication with outlets 56 and 58, to sense the pressure level at outlets 56 and 58, respectively, to produce an output signal varying as a function of one pressure level if the other is held constant or varying as a function of the difference between the two pressure levels. A pressure sensing device such as a differential pressure transducer 60 receives the measure of the pressure at outlets 56 and 58 as inputs through conduits 66 and 68, respectively, and produces an electrical output signal to an amplifier 62.

Pressure transducer 60 can be of any suitable type, for example, the type having a resistance connected to an electrical direct current source (not shown) with a zero voltage center tap arm connected to a flexible diaphragm with the pressure at each inlet applied to opposing sides of the diaphragm. A change in the relative pressure on the two sides of the diaphragm moves the arm to provide a voltage output of from zero at the center point to either a negative or positive voltage depending on the direction of movement of the diaphragm. This provides an electrical output signal having a magnitude indicating the difference between the two pressures and a polarity indicating the greater of the two pressures.

The means for controlling the means 30 for steering includes a steering control means 64 and is responsive to the electrical output signal. This means for controlling may be of any known type that responds to an input signal, preferably electrical or fluidic, to control means 30 for steering in response to the output from amplifier 62.

The means for controlling the means for moving controls the longitudinal position of the vehicle along the track and comprises a pressure sensing means for producing a signal indicating selected pressure conditions, a means for affecting pressures at the pressure sensing means, and a means responsive to the pressure sensing means signals for controlling the means for moving.

The pressure sensing means comprises a pressurized manifold assembly 70 having pressurized discharge openings 71, 72, and 73 with three pressure sensing elements of any suitable type, for example, pressure responsive responsive switches 74, 75 and 76, located respectively adjacent each of the openings.

The means for affecting pressures at the pressure sensing means 70 comprises means located at selected stations along the track for producing a back pressure at selected discharge openings 71,72 or 73 that is sensed by associated pressure sensing switches 74, 75 or 76 that provide the signal indicating the pressure conditions. The means for producing a back pressure comprises station control assemblies 80 and 90 each respectively supported on posts 81 and 91 with blocking plates 84 and 86 at assembly 80 and blocking plates 94 and 95 at assembly 90 selectively adjacent to the locus of movement of selected discharge openings and, therefore, at selected sensing elements at the desired positions along the track plates 84 and 94 control elements 74, plate 95 controls element 75, and plate 86 controls element 76.

The pressure sensing signal is received by the means for controlling the means for moving. This means for controlling comprises a logic control system 77 that produces appropriate output control signals through an amplifier 78 to a drive control means 79 that controls the movement of the vehicle along the track by controlling drive motor 21 and driving mechanism 22.

The operation of the system as the vehicle is moving is accomplished by providing a track, as with angle iron 12, defining the selected path of movement for the vehicle, and by indicating the lateral position of the vehicle relative to the track by connecting fluid pressure source 40 to and measuring the outlet pressure levels of either outlet 56 or 58, mounted on the vehicle and located in proximity to the track, to produce an outlet pressure level indicating the lateral distance of the outlet from the track. The pressure level is sensed by differential transducer 60 to control the means for steering the vehicle 30 to steer the vehicle along the path defined by the tracks in response to the pressure level. When two discharge outlets, 56 and 58 are used, the difference between the two pressure levels at the two outlets is sensed by pressure transducer 60 and the difference between these pressures controls the means for steering the vehicle.

The means for controlling the means for moving operates to stop, start, and accelerate the vehicle, as desired, in any known manner, by sensing the vehicle position along the track as it is indicated by the positioning of the pressure sensing switches 74, 75, and 76 relative to the control assemblies 80 and 90 to indicate the position of the vehicle relative to these control assemblies. Indicating the position of the vehicle when the vehicle is adjacent a control station, or position, is accomplished by producing a back pressure with the adjacent selectively placed blocking plate at selected sensing switches 74, 75, and 76 thereby indicating the proximity of the selected plates 84 and 86 at station 80, or 94 and 95 at station 90. Sensing the back pressure produces signals that are correlated through logic system 77 to control the means for moving the vehicle. The openings are connected and mounted so that the locus of movement of the openings is adjacent to appropriately positioned plates mounted at selected stations to give a different combination of back pressures for each selected station. In the embodiment shown three elements are used, but any desired number can be used with any compatible type of logic system.

While this specification contains a written description of the invention and the manner and process of making and using it and sets forth the best mode contemplated by me of carrying out my invention, there are many variations, combinations, alterations and modifications that can be made within the spirit of the invention.

I claim:

1. An automatic vehicle control system having a vehicle movable along a surface, a means for moving the vehicle, and a means for steering the vehicle, said system comprising:
  means defining a track for guiding the vehicle along a selected path of movement over the surface;
  means for supplying pressurized fluid;
  means connected to receive the pressurized fluid for indicating the lateral position of the vehicle relative to the means for guiding, said means for indicating having a pressurized fluid discharge outlet located in proximity to the means for guiding and adapted to produce a pressure level varying as a function of the lateral distance of said outlet from said means for guiding;
  means connected to sense the pressure level for producing an output signal varying as a function of said pressure level;
  means responsive to the output signal for controlling the means for steering the vehicle to steer the vehicle along the path defined by the track of the means for guiding;
  a pressure sensing means comprising a plurality of pressurized discharge openings and a plurality of respectively associated pressure sensing elements responsive to a change in pressure at its respectively associated openings for producing signals indicating selected pressure conditions at said openings;
  means for affecting the pressure at the pressure sensing means by producing a back pressure at selected openings at selected longitudinal positions of the vehicle along the path; and
  means connected to be responsive to the signals from the pressure sensing means for controlling the means for moving to thereby control longitudinal movement of the vehicle.

2 An automatic vehicle control system according to claim 1 wherein said means for affecting pressure comprises plate supported at the selected positions in proximity to the locus of relative movement of selected discharge openings upon longitudinal movement of the vehicle.

3. AN AUTOMATIC VEHICLE CONTROL SYSTEM ACCORDING TO CLAIM - WHEREIN SAID MEANS RESPONSIVE TO THE PRESSURE SENSING MEANS FOR CONTROLLING THE MEANS FOR MOVING COMPRISES A LOGIC SYSTEM FOR RESPONDING TO AND CORRELATING THE SIGNALS FROM THE PRESSURE SENSITIVE ELEMENTS TO EFFECT CONTROL OF THE MEANS FOR MOVING.

4. A method of controlling a vehicle comprising:
  providing a track defining a selected path of movement for the vehicle, moving the vehicle along the path;
  providing the vehicle with a plurality of discharge outlets;
  connecting the discharge outlets with a source of pressure;
  indicating the lateral position of the vehicle relative to the track by placing the outlets to discharge at least partially in opposition to each other at least partially normal to the path of movement and in proximity to the track to produce outlet pressure levels each indicating the distance of the respective outlet from the track;
  sensing the pressure levels and steering the vehicle in response to the difference between said pressure levels;
  indicating the longitudinal position of the vehicle along the path of movement by positioning a plurality of discharge openings on the vehicle with pressure sensing elements located to be sensitive to the pressure at said openings and thereby produce a signal indicating a change in pressure;
  positioning a plurality of plates adjacent the locus of relative movement of the discharge openings at selected positions along said path to create a back pressure at selected discharge openings; and
  correlating information derived from the signals indicating pressure changes to produce a control signal for controlling movement of the vehicle along the path in response to the correlated information.

UNITED STATES PATENT OFFICE
CERTIFICATE OF CORRECTION

Patent No. 3,570,407          Dated March 16, 1971

Inventor(s) Arthur R. Burch

It is certified that error appears in the above-identified patent and that said Letters Patent are hereby corrected as shown below:

Column 1, line 71, delete "40" after "means"

Column 2, line 69, delete the second "responsive"

Claim 2, line 2, "plate" should be "plates"

Claim 3, should read "according to claim 1" instead of "according to claim _____."

Also, claim 3 is typed in all caps.

Signed and sealed this 12th day of October, 197

(SEAL)
Attest:

EDWARD M. FLETCHER, JR.          ROBERT GOTTSCHALK
Attesting Officer                Acting Commissioner of Pate